United States Patent [19]
Reinholtz

[11] 4,129,888
[45] Dec. 12, 1978

[54] DATA RECORDING AND/OR REPRODUCING SYSTEM

[75] Inventor: William H. Reinholtz, San Gabriel, Calif.

[73] Assignee: General Instrument Corporation, Hawthorne, Calif.

[21] Appl. No.: 561,306

[22] Filed: Mar. 24, 1975

Related U.S. Application Data

[63] Continuation of Ser. No. 375,511, Jul. 2, 1973, abandoned.

[51] Int. Cl.$^2$ ............................................. G11B 5/09
[52] U.S. Cl. ................................................... 360/40
[58] Field of Search ...................... 360/39, 40, 45, 51; 340/347 DD

[56] References Cited

U.S. PATENT DOCUMENTS

| | | | |
|---|---|---|---|
| 3,562,726 | 2/1971 | Hamilton | 360/39 |
| 3,573,766 | 4/1971 | Perkins, Jr. | 360/39 |
| 3,623,041 | 11/1971 | MacDougall, Jr. | 360/39 |
| 3,750,121 | 7/1973 | Lee | 360/39 |

*Primary Examiner*—Vincent P. Canney
*Attorney, Agent, or Firm*—Ellsworth R. Roston

[57] ABSTRACT

A first digital signal characterized by a plurality of data groups each including a particular number of digital data bits is encoded to provide a second encoded signal. A storage device is provided which includes a plurality of magnetizable surface areas each associated with one of the data groups and each including a plurality of cells corresponding in number to the number of data bits in one of the data groups. The cells are further divided into a plurality of flux change positions and the second encoded signal typically contains a data bit for each of the flux change positions in the plurality of cells. A recording head magnetizes the surface of the storage device in accordance with the digital characteristics of the second encoded signal. Each of the second encoded signals is provided with at least one digital "one" and, between adjacent digital "ones", at least one digital "zero" for each flux change position in a cell. These characteristics provide the flux pattern with flux changes which are spaced by a distance greater than the length of one cell. This increases the packing density of the storage device and facilitates self-clocking of the system.

31 Claims, 5 Drawing Figures

DATA RECORDING AND/OR REPRODUCING SYSTEM

This is a continuation of application Ser. No. 375,511 filed July 2, 1973, now abandoned.

BACKGROUND OF THE INVENTION

1. Field of the Invention

This invention relates generally to the recording and/or reproducing systems and more specifically to an improved system for recording and/or reproducing digital data.

2. Description of the Prior Art

In our complex society, it is highly desirable to be able to accumulate, process and transmit various types of information or data. This data can be used, for example, to maintain inventories, sales records, or to provide other types of accounting information. It has been found that the accumulation, processing, and transmitting of this data can be facilitated by expressing the data in a digital format. Thus the data can be expressed as a plurality of digital words containing digital "ones" and digital "zeros" having positions within the digital word corresponding to the information to be transmitted. For example, in a common binary representation, the numeral 13 is expressed in digital "ones" and "zeros" as the digital word 1101.

Various types of digital processing apparatus, such as computers and associated hardware, have been developed to process the digital information. These apparatus typically include a storage device which permits storage of the digital data for an extended period of time, and retrieval of the digital data at some time in the future. Many of these storage devices include tapes, disks, drums, etc. which have a material coated on their surfaces which can be magnetized to provide flux changes from a first direction to a second direction and from the second direction to the first direction in accordance with the digital information.

Of course it is desirable to maximize the amount of information that can be stored by a given storage device. A primary limitation on this storage capacity is the resolution of the storage device which is based upon the number of flux changes that can be distinguished along a given length of the magnetized surface. The closer the flux changes are to each other, the less distinguishable they become. Thus, the resolution of the device is dependent upon the packing density of the data.

Consider for example a system including a storage device which provides a cell on the magnetizable surface for each of the bits in the digital data. Each cell is provided with a flow of flux in the first or second direction depending upon the binary characteristic, zero or one, of the associated data bit. In order to accommodate the same type of binary characteristic for adjacent bits of the digital signal, the flux has been returned to a zero or neutral state at the end of each of the data cells. This "return to zero" method of encoding has been undesirable since two flux reversals have been associated with each cell of the storage device. For this reason, the amount of surface area devoted to each bit of the data has been significant in order to distinguish adjacent flux changes.

As used herein, a cell is defined as that portion of the magnetic surface of the storage device which would be devoted to the storage of a single bit of the digital data if the storage device were magnetized in accordance with the "return to zero" method of encoding.

To maximize the separation between adjacent flux changes and therefore reduce the surface area devoted to storage of each bit of the data, the prior art includes various other systems for encoding the digital data.

In a "non-return to zero" method of encoding, the flux has been oriented in one of the first or second directions and a flux change has been produced only when the binary characteristics of the digital data have changed. For example, with the flux oriented in the first direction, a change from a digital "zero" to a digital "one" might be represented by a reversal of the flux to the second direction. A change from a digital "one" to a digital "zero" would be represented by a flux change to the first direction.

A modification of the "non-return to zero" system has provided a flux change for each of the digital "ones" in the data. Thus if the flux is initially oriented in the first direction, the next digital "one" in the data will reverse the flux to an orientation in the second direction. Similarly, the next digital "one" in the data will result in a reversal of the flux back to the first direction. These "non-return to zero" systems for encoding the data have been somewhat effective in increasing the packing density by providing not more than one flux change per cell.

Although it is desirable to minimize the number of flux changes per cell, it is also desirable to provide some means for synchronizing the retrieval of data from the storage device with the other operations in the system. With the "return to zero" system for encoding, the flux changes associated with each of these cells could be used for synchronizing. In the "non-return to zero" systems, however, there may be no flux changes for an extended period of time if the binary characteristics do not change. To provide synchronization for these "non-return to zero" encoding systems, a separate clock channel has been provided on the magnetic surface of the storage device. A separate clock channel is undesirable, of course, since it uses space on the surface of the storage device which could otherwise be devoted to the storage of data.

In a phase mode system for encoding the data, a digital "one" is recorded as a single cycle of a first square wave and a digital "zero" is recorded as a single cycle of a second square wave shifted 180° from the first square wave. Thus a flux reversal in one direction indicates the digital "one" and a flux reversal in the opposite direction indicates a digital "zero". If follows that a flux reversal in one of the first and second directions is provided for each cell of the digital data. In such a system, the flux reversals associated with the data can be used to synchronize a clock so that a separate clock channel need not be provided. One disadvantage of this system is that two flux reversals are often necessary to record a single bit of the data. As noted, this limits the maximum storage density of the device. Furthermore, it is necessary to sense the direction of the flux reversals in order to distinguish the digital "ones" and "zeros".

A modified phase mode system of encoding is described in U.S. Pat. No. 3,108,261 issued to Miller on Oct. 22, 1963. In this system, the data cells are divided into two flux change positions, one at the center of the cell and one at the end of the cell. A change of flux at the end of the cell corresponds to the digital "1" while a change of flux at the center of the cell corresponds to the digital "0". In this system, the first digital "0" appearing after a digital "1" is ignored. As opposed to the phase mode system, this modification provides flux changes which may occur no further apart than one cell. Though this system provides a packing density as great as any of the systems in the prior art and additionally provides self-clocking, an increase in the packing density is always desirable.

SUMMARY OF THE INVENTION

In the present recording and reproducing system, the data is encoded so that flux changes occur more than one cell apart on the magnetic surface of the storage device. This system can store almost twice the data stored by the modified pulse mode system before data compression becomes objectionable. For example, 7 bits of data can be stored in the same space wherein only 4⅝ bits were stored by the systems of the prior art. This will permit operation at a 5 megahertz bit rate rather than the 3.3 megahertz bit rate of the previous systems. Furthermore, the encoding system of the present invention requires no more bandwidth than the system of the prior art.

In a particular embodiment of the present invention, the data is separated into data groups each including a particular number of the data bits such as seven. On the magnetic surface of the storage device, the information associated with this particular number of data bits will be stored in an area hereinafter referred to as a frame. Since seven bits of data would correspond to seven cells, it follows that in such an embodiment, each frame would include seven cells. The frame can also be divided into a particular number of equally spaced positions, such as 14, at any of which a flux change can occur. It follows that in this particular embodiment there are two flux change positions associated with each cell in the frame.

In accordance with the present invention, the 7 bits of data in the frame can be encoded in such a manner that flux changes occur no closer than three flux change positions apart. Thus for a particular flux density, 50% more data can be stored with the present system than with any of the systems of the prior art. The present system also provides at least one flux change per frame for self-clocking.

A Read-Only Memory (ROM) is provided which can be addressed by each of the data groups containing the particular member of data bits, such as 7. In response to each of the data groups, the ROM provides an associated encoded word which typically contains a data bit for each of the flux change positions in the frame. For example, in response to a data group containing the seven bits of data, the ROM provides an encoded word which may contain 14 bits of data. The particular data provided in the encoded word is written onto the magnetic surface of the storage device in the associated frame.

In this particular embodiment of the invention, the digital "ones" in the encoded word are separated by at least two digital "zeros". It follows that if a flux change is provided on the magnetic surface for each of the digital "ones" in the encoded word, the flux changes are separated by at least 1½ cells. As a further limitation upon the data and the encoded word, it is desirable to provide a particular pair of digital "zeros" either at the beginning of each encoded word or at the end of each encoded word. These particular "zeros" insures that a digital "one" occurring at the opposte end of the encoded word will be separated from any digital "one" occurring in the adjacent encoded word by at least the particular pair of digital "zeros".

To retrieve the information from the storage device, the particular flux pattern associated with the encoded word is read from the magnetic surface to provide the encoded word. This encoded word is then used to address a ROM which responds to the particular encoded word to provide a data group containing the particular number of data bits. More specifically, a 14 bit encoded word can be read from the storage device and the 12 most significant bits thereof can be compressed to 8 bits in a logic network. These 8 bits then can be used to address a ROM providing at its output the seven bit data groups associated with the data initially encoded.

Using the encoding method of the present invention, the data actually written onto the magnetic surface of the storage device is arranged to maximize the separation of flux changes. Nonetheless, a flux change can be provided in each of the data frames to facilitate self-clocking for the retrieval of the data. Using the present encoding system, 1 inch of the surface on the encoding device can store information related to 2700 bits of data as opposed to systems of the prior art which are limited to only 1800 bits per inch.

Although the detailed description will be directed primarily to an encoding system including a storage device having a magnetic surface, it will be apparent to those skilled in the art that the invention can be embodied to include other types of storage devices. Optical as well as ferromagnetic storage devices can also be provided with increased packing densities in accordance with the invention disclosed herein.

These and other features and advantages of the present invention will become more apparent with a description of the preferred embodiment as illustrated in the associated drawings.

DESCRIPTION OF THE PREFERRED EMBODIMENTS

Figure 1:
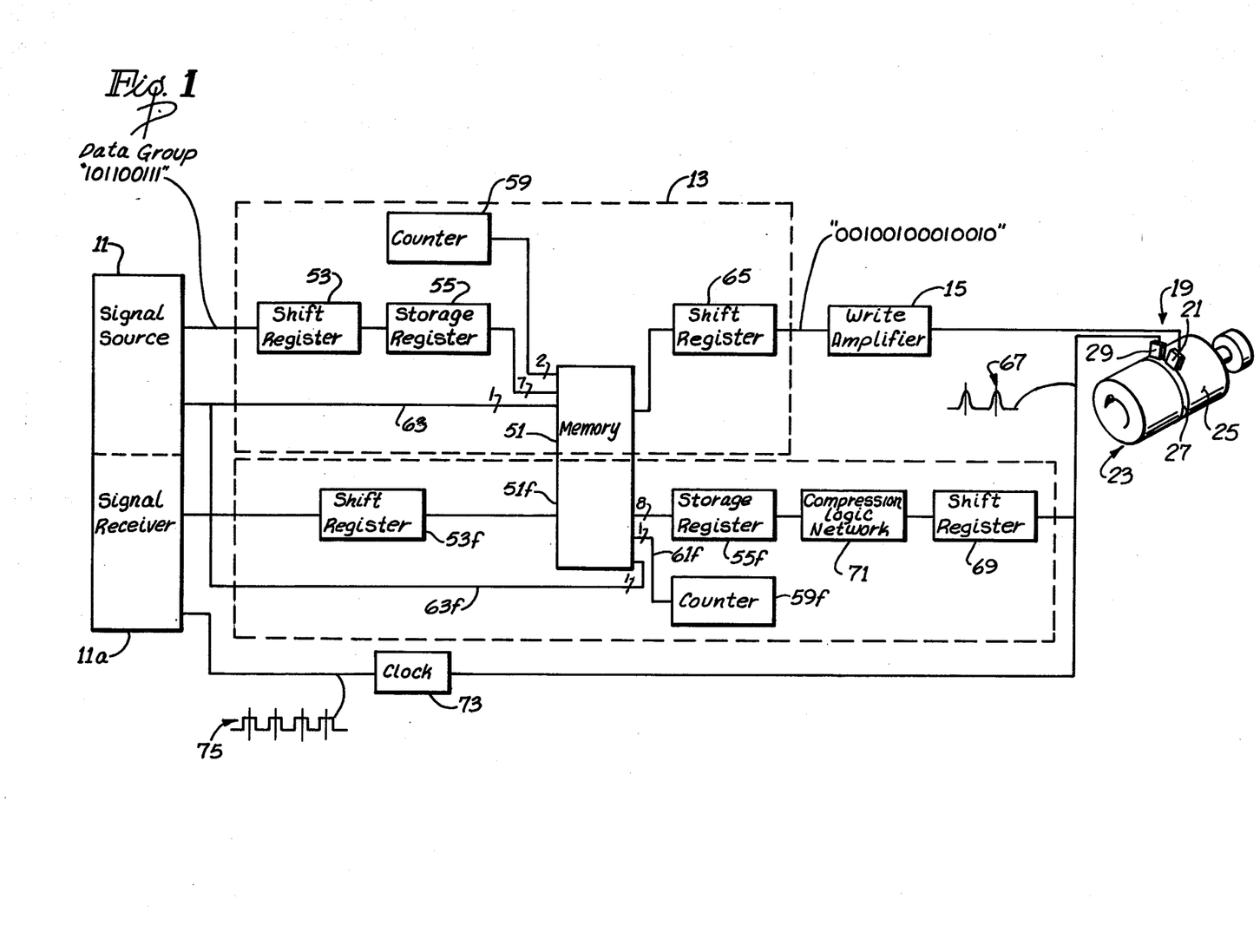
FIG. 1 is a block diagram of one embodiment of the present invention illustrating a storage device for recording and reproducing digital data.

A data storage and reproducing system is shown generally in FIG. 1 and includes a signal source 11. The source 11 will typically be a data processing apparatus, such as a computer, which provides information in the form of a first digital data signal. Such a signal is typically represented by a series of digits which occur at sequential time intervals and typically express one of two states. These digits are commonly referred to as data bits and, in binary logic, the two states are commonly referred to as a digital "one" and a digital "zero".

The signal from the source 11 can be introduced to an encoding means 13 which provides a second encoded signal in response to the first data signal. The encoded signal can also be a digital signal comprising a plurality of digital "ones" and "zeros", which have a known relationship to the digital "ones" and "zeros" in the first signal. Thus the encoded signal provides information that is related to the information in the first data signal.

The encoded signal can be amplified by a write amplifier 15 and introduced on a conductor 17 to a recording device shown generally at 19. The recording device 19 will typically include a plurality of recording heads 21, only one of which is shown in FIG. 1. The recording device 19 will also include a storage device such as a tape, disk or drum 23. The storage device, such as the drum 23, has a magnetizable surface 25 moveable relative to the recording head 20 by the motor 30 so that each of the heads 21 is associated with a path or channel 27 on the surface 25. The recording head 21 is energized in accordance with the second encoded signal to provide a permanent magnetic pattern in the channel 27. Since the magnetic pattern has a known relationship with the second encoded signal which in turn corresponds to the information in the first data signal, it follows that the information in the first data signal corresponds to the magnetic pattern in the channel 27.

In order to retrieve the information recorded on the recording device 19, a playback head 29 can be provided and aligned with the channel 27. Then, as the surface 25 is moved relative to the playback head 29 by the motor 30, a third encoded signal is produced by the head 29 in accordance with the magnetic pattern in the channel 27. The third encoded signal will also be a binary signal consisting of digital "ones" and "zeros" and will have substantially the same characteristics as the second encoded signal. It follows that the third encoded signal will provide the same information as the first data signal. The third encoded signals can be introduced to a decoding means 31 which provides a fourth data signal having binary characteristics similar to the first data signal. The fourth data signal can then be introduced to a signal receiver 11a which will typically be the same computer as the signal source 11.

Figures 2, 3A:
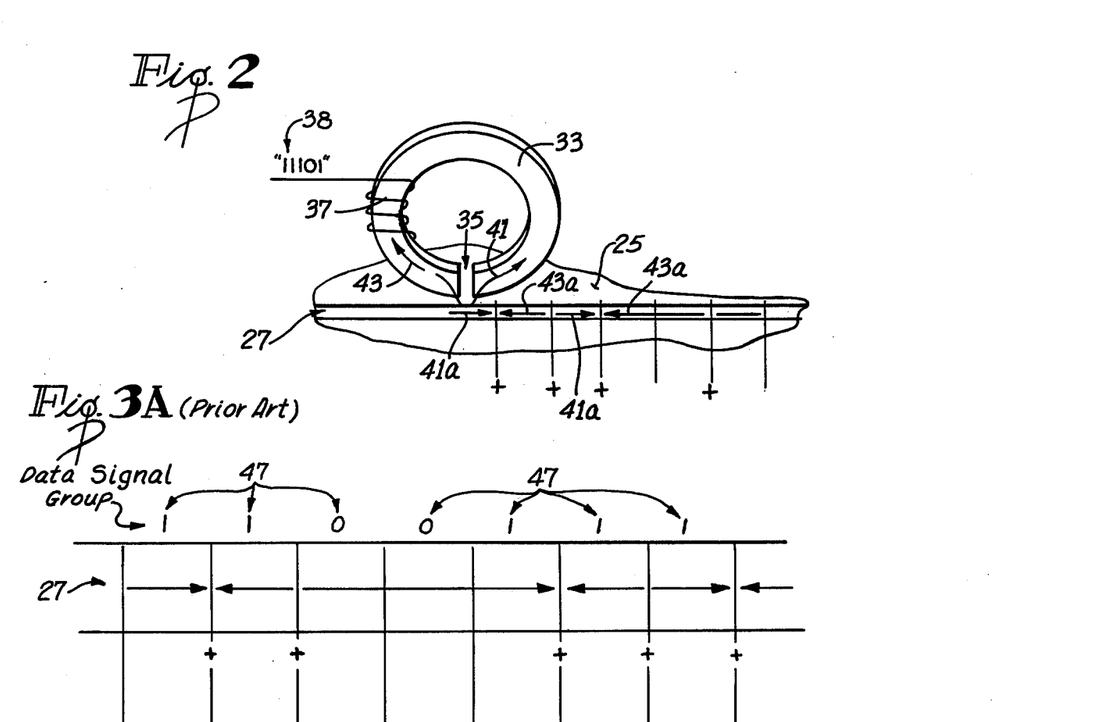
FIG. 2 is a front elevational perspective of a recording head energized by a digital signal to produce a flux pattern on the storage device.
FIG. 3A is an enlarged plan view of a flux pattern which might be produced by a particular digital signal group encoded in accordance with a system of the prior art.

Of particular interest to the present invention is the flux pattern produced in the channel 27 by the recording head 21. Referring now to FIG. 2, it will be noted that in general a recording head, such as the head 21, will typically include a core 33 defining a gap 35 in close proximity to the surface 25. A particular digital signal 38, such as the second encoded signal, can be introduced to a coil 37 on a conductor 39, such as the conductor 15. The coil 37 is responsive to the particular digital signal 38 to produce in the core 33 flux having directions dependent upon the binary characteristics of the particular digital signal 38. With the gap 35 in close proximity to the surface 25, the flux in the coil 37 provides the channel 27 with a flux pattern dependent upon the data in the particular signal 38.

As noted, the direction of the flux in the core 33 is dependent upon the relationship of the digital "ones" and "zeros" in the particular signal 38. For example, a digital "one" in the signal 38 might produce a flux reversal so that the flux flows in the core 33 in the direction of the arrow 41. The next digital "one" in the particular signal 38 might also produce a flux reversal so that the flux flows in the core 33 in the direction of the arrow 43. With the magnetizable surface 25 moving relative to the head 16, for example in the direction of the arrow 45, the magnetizable material in the channel 27 will be permanently magnetized in accordance with the changes in the flux directions in the core 33 with time. For example, when the flux flows in the direction of the arrow 41, the magnetizable material in the channel 27 will be oriented in the direction of the arrows 41a. Similarly, when the flux flows in the core 33 in the direction of the arrow 43, the magnetizable material in the channel 27 will be oriented in the direction of the arrows 43a. A change in the direction of the arrows 41a and 43a would then indicate the relative position of the digital "ones" in the particular signal 38. For a particular signal 38, such as that illustrated in FIG. 2 to have the binary characteristics "11101", the positions of these flux changes along the channel 27 are marked by a plus sign (+). It will be noted that the plus signs (+) along the channel 27 correspond to the position of the digital "ones" in the particular signal 38.

In the present invention, the data bits in the first data signal are divided into data groups which may contain any number of the data bits. For example, in a preferred embodiment of the invention, each of the data groups contains 7 data bits. For the purposes of discussion, a data group consisting of the bits "1100111" is illustrated at the left of FIG. 1 and also at the top of FIG. 3A. If these seven data bits were recorded on the recording device 19 in accordance with the "non-return to zero" method of encoding of the prior art, the material in the channel 27 would be magnetized in accordance with the arrows 41b and 43b illustrated in the channel 27 of FIG. 3A. It can be seen that the space required to store each of the data bits in the data signal corresponds to a particular length of the channel 27. The width of the channel 19 and the particular length associated with each data bit defines an area which is commonly referred to as a cell. Each of the seven cells associated with the seven bits in the data signal group is designated generally by the reference numeral 47. The particular number of cells 33 which are associated with a particular number of data bits in a data group, such as 7, define an area of the channel 27 which will be referred to hereinafter as a frame.

It should be noted in particular that if the data signal were written directly on the drum 23 in accordance with this "non-return to zero" method of encoding, a flux change would occur in the channel 27 at the end of each of the cells 47 corresponding to a digital "one". It follows that if two or more digital "ones" occur in succession in the data group, a flux change will occur at the end of the associated adjacent cells 47. For the particular data group illustrated, "1100111", flux changes would occur at the positions designated by the plus signs (+) in FIG. 3A. As previously noted, a deficiency of this encoding system of the prior art is that adjacent digital "ones" in the data signal provide flux changes or plus signs (+) which are separated by the length of only one cell 47.

It is of course desirable to minimize the area of the channel 27 which is devoted to the recording of a given quantity of information. This maximizes the amount of information that can be recorded on a particular storage device such as the drum 23. However, the more information packed into a given area of the channel 27, the more closely packed the cells 47 become. Also, as previously illustrated, adjacent cells may each provide a flux change, so that the close spacing of the cells 33 ultimately makes adjacent flux changes indistinguishable. This of course results in a loss of information. Thus the spacing of the flux changes has provided an upper limit upon the amount of information that can be stored on a given storage device such as the drum 23.

In accordance with the present invention, the encoding means 13 provides the second encoded signal with characteristics such that the flux changes in the channel 27 are spaced a distance greater than the length of one cell 33. This enables the cells 33 to be even more closely packed without affecting the ability of the playback head 29 to distinguish adjacent flux changes. It follows that more information can be encoded on the same area of the channel 27. In fact, 2700 bits of information can be recorded on an area previously devoted to only 1800 bits of information in accordance with the system of the prior art.

Figure 3B:
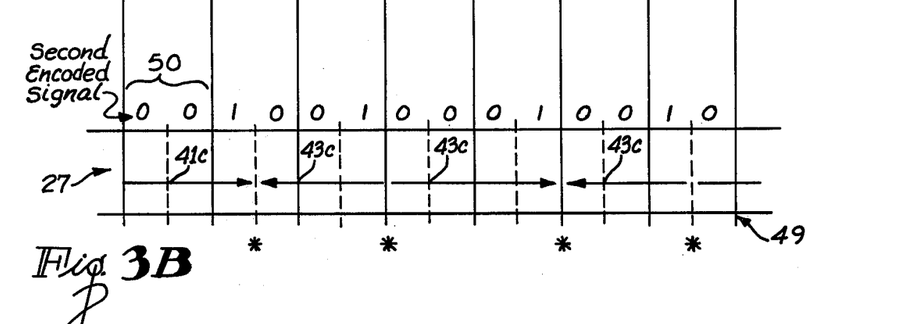
FIG. 3B is an enlarged plan view of a flux pattern which might be produced by the particular digital signal group encoded in accordance with the present invention.

Referring now to FIG. 3B, it will be noted that each of the cells 47 in channel 27 can be divided into a particular number of flux change positions, such as 2. For example, a flux change can be detected at either the center or the end of a cell 47. It follows that the number of flux change positions in a frame equals the number of flux changes per cell times the number of cells per frame. In FIG. 3B, 14 flux change positions are marked by the dotted lines 49. The second encoded signal, such as the signal "00100100010010" illustrated at the top of FIG. 3B, typically provide a binary digit for each of the flux change positions in the frame.

The second encoded signal should have characteristics for conveying the same quantity of information as that conveyed by the data signal group. Additionally, the second encoded signal should have binary characteristics which provide flux changes in the channel 27 which are separated by a length greater than that of one cell 47. It is further desirable that the second encoded signal have characteristics for providing at least one flux change per frame to provide a timing reference. Each of these characteristics will be discussed separately below.

As stated, the second encoded signal preferably has binary characteristics which provide the associated magnetic pattern in the channel 27 with flux changes which appear not closer than the length of one cell 47. This will permit an increased packing density so that more information can be stored on the drum 23. One method for accomplishing this purpose is to separate the digital "ones" in the second encoded signal by at least the particular number of flux change positions per cell 47. In a preferred embodiment wherein there are two flux change positions per cell, the digital "ones" in the second encoded signal are separated by at least two digital "zeros". In the channel 27, such an encoded signal provides flux changes which are separated by three flux change positions or 1½ cells.

It is possible that a second encoded signal having a digital "one" at the beginning thereof may follow a second encoded signal having a digital "one" at the end thereof so that two flux changes would appear next to each other in the channel 27 unless otherwise separated. To alleviate this possibility, the second encoded signal can be provided with spacing "zeros" 50 at the beginning and/or end of each of the second encoded signals. The spacing "zeros" 50 should separate the last digital "one" in a preceding second encoded signal from the first digital "one" in the following second encoded signal. To provide the desired separation, the spacing "zeros" 50 should be equal to or greater than the number of flux change positions per cell 47. A pair of spacing "zeros" 50 are shown at the beginning of the second encoded signal in FIG. 3B.

With continued reference to FIG. 3B, note that the separation of the digital "ones" in the second encoded signal increases the length of the flux arrows 41c,43c so tha the flux changes, which are marked by an asterisk (*), are separated by a length greater than that of one cell 47. In this embodiment, even the minimum separation of the digital "ones" in the second encoded signal spaces the flux change positions (*) by a distance equal to the length of 1½ cells 47. It should be noted in particular that the separation of the asterisk signs (*) in FIG. 3B is greater than the separation of the plus (+) signs in FIG. 3A. Thus the flux changes in the 14 bit encoded signal of FIG. 3B are more easily distinguished by the playback head 29 than the flux changes in the 7 bit data signal group illustrated in FIG. 3A. This permits a compression of the cells 47 so that information related to 2700 bits of the first data signal can be stored in the same space which was previously limited to only 1800 bits.

The third encoded signal can provide a timing reference if at least one flux change occurs in each frame of the channel 27. To insure that this advantageous condition occurs, each of the second encoded signals can be provided with at least one digital "one". In other words, a second encoded signal containing only digital "zeros" need not be permitted in this system of encoding. This timing criteria will be discussed in greater detail below.

As previously stated, a second signal encoded in accordance with the spacing and timing criteria previously discussed, should also be capable of expressing the same amount of digital information as the associated data group of the first data signal. For example, if a data group consisting of seven data bits can express 128 items of information, the second encoded signal should also be capable of expressing the same number of items of information. It will be apparent to those skilled in the art that a second encoded signal limited in accordance with the spacing and timing criteria previously discussed can express 128 items of information with 12 binary bits. With the addition of the two spacing "zeros" 50, this provides a desirable second encoded signal such as the illustrated in FIG. 3B with 14 bits.

The following table will illustrate a portion of a typical correlation of 7-bit data signal groups and the associated 14-bit second encoded signals which can be written onto the surface 25 of the drum 23.

| First Data Signal Data Group | Second Encoded Signal |
|---|---|
| | spacing zeros |
| 0000000 | 00000000000001 |
| 0000001 | 00000000000010 |
| 0000010 | 00000000000100 |
| . | . |
| . | . |
| . | . |
| 0001011 | 00100000000000 |
| . | 00000000001001 |
| . | 00000000010010 |
| . | 00000000100100 |
| . | . |
| 0010100 | 00100100000000 |
| 0010101 | 00000000010001 |
| . | . |
| . | . |
| 0010111 | 00000000100001 |
| . | . |

| First Data Signal Data Group | Second Encoded Signal |
|---|---|
| 0011100 etc. | 00000001000001 etc. |

In this table it will be noted that the first signal will typically have a common straight binary representation while the second encoded signal will have the digital "ones" spaced by at least two digital "zeros". Also note that at least one digital "one" is provided in each of the second encoded signals for a timing sequence. The two digital "zeros" to the left of each second encoded signal are the spacing "zeros" designated by the reference numeral 50 in FIG. 3B.

Although this embodiment of the invention defines a data group as including 7 bits and the corresponding second encoded signal as including 14 bits, the scope of the invention is not restricted by data groups of this size. For example, a data group can be defined as including any number of cells, such as 6 cells, in which case the associated second encoded signal restricted as set forth above would include 13 bits of data. In general, it has been found that the number of data bits in the second encoded signal corresponding to the number of data bits in a data group of the first signal will occur in a ratio of at least 2 to 1. Of course, the smaller ratios are preferred to maximize the information per data bit in the second encoded signals.

Referring again to FIG. 1, the encoding means 12 can be provided with a memory means such as a ROM 51. This ROM 51 is typical of those commonly available which store a different output signal at each of a plurality of addresses. In response to the receipt of a particular address signal, the ROM 51 provides an associated output signal which has been stored at the particular address. The digital address signal and the digital output signal have a known relationship. In the present invention, each of the digital address signals includes one of the data groups of the first data signal. In a particular embodiment, several digital address signals may include the same data group in addition to other information as will be discussed below.

For the reasons previously discussed, it is desirable that the ROM 51 provide output signals having more data bits than the address signals. For example, in a preferred embodiment where the data groups consist of seven data bits, it is desirable that the ROM 51 provide output signals containing twelve data bits. Thus, ideally the ROM 51 might store twelve bit output signals at addresses referenced by seven bit address signals.

A particular ROM 51 which is more economically available is that manufactured by Signetics, Inc. and marketed under catalog number N8228A. This particular ROM 51 has characteristics for storing 1024 digital output signals each containing four bits. Each of the four bit output signals is stored at an address which is referenced by a digital address signal containing 10 data bits. In order to provide the desired 12 bit output signal using the 7 bit address signal, it is desirable that a single data group of the first data signal be used repeatedly until the desired number of output bits is provided by the ROM 51. It follows that if the output signals of the ROM 51 each contain four bits and the desired number of bits in the output signal is 12, a single data group of the first data signal can be used three times to address three different 4 bit output signals.

To provide for this repeated addressing by the same data group, each data group can be initially introduced by the signal source 11 into a shift register 53. To accommodate a seven bit data group, the shift register 53 can include four 2-bit shift registers of the type commonly designated throughout the electronics industry by the catalog number SN 74H74.

From the shift register 53, the particular data group can be shifted into a storage register 55. The register 55 can be of the type provided by a combination of two 4-bit storage registers commonly designated throughout the electronics industry by the catalog number SN7475. From the register 55, the particular data group can be repeatedly introduced to the ROM 51 on the plurality of input address lines designated collectively by the reference numeral 57. Of course it is desirable that each of the repeated address signals containing the same 7 bit data group be distinguishable so that a different address in the ROM 51 is referenced with each addressing step in the addressing sequence. These three address signals can be distinguished by the use of a counter 59 which provides different binary data for each addressing step on a pair of input address lines 61 of the ROM 51. For example, the counter 59 may provide a different one of the binary signals 01, 10 and 11 on the lines 61 during each of the addressing steps in the addressing sequence.

In addition, it may be desirable to provide an input address line 63 from the signal source 11 which has characteristics of providing a digital "one" when the first data signal is being encoded by the ROM 51. It follows that although the signals on the lines 57 and 63 may not change for a particular data group, the signal on the lines 61 will change so that the 10 bit address signal varies slightly during each step of the addressing sequence. In this manner, a 7 bit data group can write 3 output signals from the ROM 51 to provide the desired 12 bit output signal. These 12 bits of data can be loaded into a shift register 55 to provide a portion of the second encoded signal.

As previously noted, it may be desirable to add the spacing "zeros" 50 at the beginning and/or end of each of the 12 bit output signals to provide the desired separation between adjacent second encoded signals. This is accomplished, in a preferred embodiment, by providing the shift register 65 with 14 data spaces. The two data spaces not occupied by the 12 bit output signal from the ROM 51 will automatically provide the pair of spacing "zeros" 50 at the beginning of the 14 bit encoded signal. A 14 bit shift register can be formed by combining seven 2-bit shift registers of the type commonly designated throughout the electronics industry by the catalog number SN 74H74.

From the shift register 65, the second encoded signal can be amplified by the write amplifier 15 before being introduced to the recording head 21. In the present invention, it is this second encoded signal which is written onto the surface 25 of the drum 23 in the manner discussed with reference to FIG. 2.

The reproduction of the information on the drum 23 can be accomplished in a method which is substantially the reverse of that described for the encoding means 13. It will be noted that many of the components in the encoding means 13 can be shared by the decoding means 31. In the following description of the decoding means 31, these common components are designated by the same reference numeral followed by a lower case "f".

As the drum 17 revolves, the playback head 29 is energized to provide the third encoded signal with a peak 67 in response to each of the flux changes in the channel 27. The third encoded signal can be introduced to a shift register 69 wherein each of the peaks 67 will be defined as a digital "1". Since the spacing "zeros" 50 do not contain information, the information content of the third signal is associated with only 12 of the 14 bits written into the channel 27. For this reason the shift register 41 can be a 12 bit shift register such as that provided by a combination of six 2-bit shift registers commonly designated throughout the electronics industry by the catalog number SN 74H74.

Ideally, the 12 bit signal in the shift register 69 could be used to address a memory means such as a ROM to provide a seven bit output signal similar to the first data signal. Such a ROM would store 7 bit signals in addresses referenced by 12 bit signals.

It will be recalled that in a particular embodiment, the ROM 51 had 1024 4-bit addresses. The encoding means 13 used three of these addresses for each of the 128 possible items of information in a data group. Therefore, only 3 × 128 or 384 of the 1024 addresses in the ROM 51 were used in the encoding means 13. In a preferred embodiment, the remaining address can be used in the decoding means 31 to provide 4-bit output signals in response to 10 bit address signals. In this particular embodiment, it is desirable that the 12 bits in the shift register 69 be introduced to a compression logic network 71.

In general, it is the purpose of the compression logic network 71 to remove from the third signal many of the digital "zeros" which had been provided in the second signal to maximize the storage characteristics of the drum 23. Although this data compression can be accomplished in many ways, a preferred method of doing so is to divide the 12 bits in the third signal into 4 groups having 3 bits each. As shown in the table below, the 3 bits in each group can be designated by the letters A, B and C. Due to the characteristics of the second signal and hence the third signal, the 3 bits, ABC, will include three digital "zeros" or a digital "one" adjacent to two digital "zeros". In response to each of the 3-bit groups, the network 71 can provide a digital word containing two bits, X and Y. The bit X can be a digital "one" if either of the bits A and B are digital "ones". The bit Y can be a digital "one" if either of the bits A and C are digital "ones". Thus each of the three bits, ABC, can result in two bits, XY, as tabulated below.

| A | B | C | X | Y |
|---|---|---|---|---|
| 0 | 0 | 0 | 0 | 0 |
| 0 | 0 | 1 | 0 | 1 |
| 0 | 1 | 0 | 1 | 0 |
| 1 | 0 | 0 | 1 | 1 |

Figure 4:
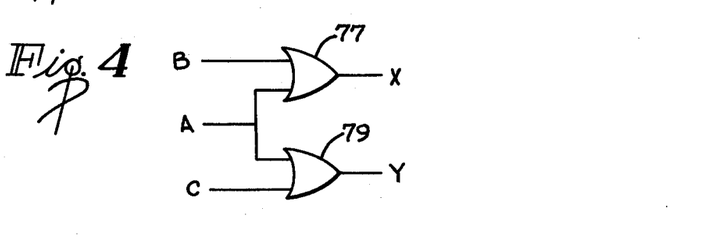
FIG. 4 is a logic diagram showing a portion of one embodiment of a compression logic network which can be used with the present invention.

As illustrated in FIG. 4, this data compression can be easily implemented with a pair of "OR" gates 77 and 79 for each of the 3-bit words in the third signal. By compressing each of the 3-bit words, ABC, into 2-bit words, XY, the 12-bit third signal is compressed to 8 bits. These 8 bits are loaded into the storage register 55f. The eight bits of data from the storage register 55f can be introduced into a ROM 51f which may be the other half of the ROM 51.

It will be recalled that a preferred embodiment of the ROM 51 provided 4 bit output signals in response to 10 bit address signals. In such an embodiment, the compressed signal from the register 55f provides 8 of the 10 bits in the address signal. These 8 bits can be introduced to the ROM 51f on 8 address lines designated 57f. The lines 57f can include the seven lines 57 plus one of the pair of lines 61. The read/write line 73 can also be coupled to the ROM 51f to provide a read signal such as a digital "zero" on an address line 63f.

Since this particular embodiment of the ROM 51f provides output signals having 4 bits, and the desired output signal has 7 bits, it is desirable to address the ROM 51f twice for each of the 8 bit signals in the storage register 55f. In the manner previously discussed, this repeated addressing of the ROM 51f may be accomplished by a counter 59f providing a digital "1" and a digital "0" in consecutive steps of the addressing sequence. These signals can be provided on the other of the pair of line 61 which is designated 61f in the decoding means 31.

This repeated addressing of the ROM 51f will provide a pair of 4 bit words containing the 7 data bits of the fourth data signal. These 7 data bits will correspond both in digital state and placement to the data bits in the first data signal. The eighth data bit from the ROM 51f is superfluous and can be disregarded. The output of the ROM 51f can be loaded into a shift register 53f prior to being introduced to the signal receiver 11a.

It is desirable to synchronize the timing of the operations performed by the receiver 11a with the information read from the channel 27. In a preferred embodiment, a clock 73 provides a plurality of clock pulses shown generally as 75, which are synchronized with the peaks 67 in the third encoded signal. It will be recalled that one of the encoding criteria called for at least one digital "one" to be among the bits in the second encoded signal. It is this desirable feature which insures that in the time interval associated with each data group of the first signal, a peak 67 occurs in the third signal for synchronizing the clock 73.

The data recording and/or reproducing system described above is particularly advantageous because it increases the amount of digital information which can be stored on a given storage device such as the drum 23. By dividing the cells 47 into a plurality of flux change positions, and encoding the data to provide an encoded signal having a bit for each of the flux change positions in a frame, the separation of the flux changes in the frame can be maximized. Thus the encoded signal can be provided with a particular number of digital "zeros" separating the digital "ones" in the signal wherein the particular number corresponds to the number of flux change positions in a cell. Such an encoded signal would provide the flux changes in the frame with a separation greater than the length of one cell. In the preferred embodiment, these flux changes were separated by one and a half cells so that information associated with 2700 bits of data can be stored in the same area previously devoted to only 1800 bits of data. Each of the encoded signals can also be provided with a plurality of spacing "zeros" at the beginning and/or the end of the encoded signal to provide for the desired spacing between digital "ones" in adjacent encoded signals.

The encoded signal can also provide at least one digital "one" so that each of the frames on the drum 23 contains a flux change. This provides at least one peak 67 in the third encoded signal for each of the frames on the drum 23. These peaks 67 can be used to synchronize the pulses 75 provided the clock 73. In summary, this system of recording and/or reproducing data provides a substantial increase in the packing density of the storage device such as the drum 23 and in addition provides self-clocking to synchronize the operations of the system.

Although the present invention has been disclosed with reference to a particular recording device 19 which has a surface 25 including a magnetizable material, it will be apparent to those skilled in the art that the concept of encoding a signal to maximize packing density is applicable to other types of recording devices. Optical signals can also be encoded to increase the packing density on a recording medium of photographic film. Ferromagnetic storage devices can also benefit from the encoding concept of the present invention.

Also, though the embodiment disclosed includes a specific ROM 51 which is economically available, other memory devices can be substituted to perform the memory function. It is apparent that other embodiments of the inventive concept will now be obvious to those of ordinary skill in the art. For this reason the scope of the invention should be ascertained only with reference to the following claims.

I claim:

1. In combination for recording a data group having characteristics for expressing one of a particular number of first digital combinations, the data group including a first plurality of data bits each having digital information of first or second digital characteristics, comprising:
   first means responsive to the data group for encoding the data group to provide for a second plurality of encoded signals greater in number by a particular factor than the data bits of the first plurality and including at least one data bit of the first digital characteristics with each digital bit of the first digital characteristics followed by a particular number of data bits of the second digital characteristics at least equal to the particular factor; and
   second means responsive to the first means for recording the data bits produced by the first means.

2. The combination recited in claim 1 wherein third means are provided for recording an encoded signal having at least a pair of data bits of the second digital characteristics prior to the recording of the second plurality of encoded signals to provide for a proper separation of the information recorded for the data group from the information recorded for adjacent data groups.

3. The combination recited in claim 1 wherein the first means includes a Read Only Memory responsive to the information in the data group for encoding the data group to provide for the second plurality of encoded signals.

4. The combination recited in claim 2 further comprising:
   third means providing a timing signal including a multiplicity of periodic pulses; and
   fourth means responsive to the timing signal to synchronize the provision of the first plurality of data bits and the production of the second plurality of encoded signals with the production of the timing signal.

5. The combination recited in claim 2 wherein the first means provide timing signals for the signals of an adjacent data group in accordance with the production of the at least one digital bit of the first digital characteristics in the second plurality of encoded signals for the data group.

6. In combination for recording information from a plurality of data groups each including a first plurality of data cells each having digital information of first or second digital characteristics, comprising:
   storage means for storing digital information of the first and second digital characteristics for each of the data groups,
   recording means cooperative with the storage means for recording the digital information of the first and second digital characteristics in the storage means for each of the data groups,
   first means responsive to the digital information from the data cells in each of the data groups for producing for such data group a plurality of digital signals greater in number by a particular factor than the first plurality of data cells for such group and having at least one signal of the first digital characteristics with each digital signal of the first digital characteristics being followed by digital signals of the second digital characteristics at least equal to the particular factor; and
   second means responsive to the signals produced by the first means for obtaining a recording of such signals by the recording means.

7. The combination recited in claim 6 wherein:
   the first means provides a production of at least the one digital signal of the first characteristics in the plurality of signals for each data group and then at least a particular number of the digital bits of the second characteristics in such plurality of signals greater than the first characteristics.

8. The combination recited in claim 6 wherein means are included in the first means for providing for the production of at least a particular number of digital signals of the second characteristics for each data group prior to the production by the first means of the plurality of digital signals for that data group where the particular number of signals of the second digital characteristics is at least equal to the particular number.

9. The combination recited in claim 7 wherein the first means provides for each data group a number of digital signals at least twice as great in number as the number of data cells in the data group.

10. The combination recited in claim 9 wherein means are provided for producing a pair of digital signals of the second characteristics for each data group prior to the production of the plurality of digital signals for the data group.

11. The combination recited in claim 6 wherein:
   the first means are operative to produce for each data group digital signals of the first characteristics separated in each data group and in adjacent data groups by at least the particular number of digital signals of the second characteristics.

12. A system for recording and reproducing first digital groups of signals, each of the first digital groups including digital "zeros" and digital "ones" totalling a particular number and disposed in individual patterns to represent information, comprising:
   encoding means responsive to the signals in each of the first digital groups to provide, for each such first group, a second group of digital signals representing the pattern of signals in the first group and having a number greater by a particular factor than the number in the first digital group and including one or more digital "ones" each spaced by a particular number of digital "zeros" at least equal to the particular factor;

storage means having properties for being polarized in one of first and second directions to record successive ones of the digital "ones" in each of the second digital groups; and recording means disposed in operably coupled relationship to the storage means and responsive to each of the digital "ones" in the second digital groups to provide a change in the direction of the polarization on the storage means.

13. The system recited in claim 12 wherein the encoding means includes memory means responsive to the first digital groups of signals to provide the patterns of digital signals in the second digital groups.

14. The system set forth in claim 12 wherein the encoding means includes:

memory means responsive to the first groups of digital signals to provide the patterns of digital signals in the second digital groups and to provide at least the particular number of encoding signals of digital "zeros" at a particular one of the beginning or end of each of the second groups of digital signals.

15. The system recited in claim 13 wherein:
the storage means comprises a magnetizable member.

16. A system for recording and reproducing information in first groups of digital signals characterized by a first particular number of data bits in each data group where the signals in each group have a pattern of digital "ones" and "zeros" representative of particular information, including:

first means for encoding the digital signals in each of the first groups to provide second groups of digital signals having a second particular number of data bits greater by a particular factor than the first particular number of data bits and having a predetermined pattern relative to the signals in the first group where each signal representing a digital "one" in each of the second groups is followed by a particular number of digital "zeros" at least equal to the particular factor;

storage means;

second means responsive to the second groups of digital signals to record the second groups of digital signals on the storage means;

third means responsive to the second groups of digital signals recorded on the storage means to reproduce such second groups or digital signals; and fourth means responsive to the reproduced second groups of digital signals to recover the first groups of digital signals.

17. The system recited in claim 13 wherein:
the first means is constructed to provide, for each individual pattern of signals in the second groups, at least one digital "one" in each of the second groups with each digital "one" in the second group being followed by at least the particular number of digital "zeros" and wherein each of the second groups is preceded by at least the particular number of digital "zeros" and the first means is constructed to record at least such particular number of digital "zeros" in the positions preceding the individual pattern of signals for each of the second groups of digital signals.

18. The system recited in claim 17 wherein:

the fourth means is constructed to disregard at least a particular number of digital "zeros" preceding the individual pattern of digital signals for each of the second groups in recovering the individual patterns of signals for each of the first groups.

19. The system recited in claim 16 wherein the fourth means includes:

fifth means responsive to the pattern of signals produced by the second means for each of the second groups to disregard at least the particular number of digital "zeros" preceding each of the second groups of digital signals in recovering the first groups of digital signals.

20. The system recited in claim 16 wherein the storage means constitutes a magnetic storage member and the second means produces flux changes upon each transition between a digital "one" and a digital "zero" in the signals in the second groups and the third means recovers the digital "ones" and the digital "zeros" in accordance with each of the flux changes recorded in the storage means by the second means.

21. The combination set forth in claim 20 wherein the first means includes a memory constructed to store each of the second data groups at an address corresponding to an associated one of the first data groups, the memory being responsive to each of the first data groups in the first data signal to provide the associated second data groups from the associated address.

22. In combination for recording a first data signal characterized by a plurality of data bits of first characteristics and a plurality of data bits of second characteristics randomly positioned in a plurality of first data groups, comprising:

first means responsive to the first data signal for providing a second data signal in a plurality of second data groups characterized by a plurality of data bits in each of the second groups greater in number by a particular factor than the plurality of data bits in each of the first groups and having each of the data bits of the first characteristics spaced from one another by at least a particular number of data bits of the second characteristics at least equal to the particular factor;

storage means having properties for being changed in accordance with the characteristics of signals to be recorded on the storage means; and transducing means disposed relative to the storage means and responsive to the second data signal from the first means for altering the properties of the storage means in accordance with the individual pattern of the data bits in the second data signal.

23. In combination for reproducing digital information originally provided for a data group having digital bits of first and second characteristics in a first digital form and recorded in a second digital form having digital bits of first and second characteristics and having a greater number of digital bits by a particular factor than the digital bits in the first form where each digital bit of first characteristics in the second digital form is followed in the second digital form by a particular number of digital bits of second characteristics at least equal to the particular factor;

storage means for storing the digital bits of first and second characteristics in the second digital form to represent the digital information for the data group;

reproducing means associated with the storage means for reproducing the digital bits of first and second characteristics for the data group from the storage means; and restoring means responsive to the digital bits of first and second characteristics from the reproducing means for restoring the digital information for the data group into the first digital form.

24. The combination set forth in claim 23 wherein the restoring means are responsive to each individual pattern of digital bits of first and second characteristics in the second digital form for the data group to convert such individual pattern into an individual pattern of digital bits of first and second characteristics in the first digital form for the data group.

25. The combination set forth in claim 23 wherein the digital bits in the second digital form for the data group are preceded by at least the particular number of digital bits of the second characteristics and wherein the restoring means are operative to disregard such at least particular number of digital bits of second characteristics in restoring the digital information in the first digital form in the data group.

26. The combination set forth in claim 23 wherein the digital information in the second digital form in the data group is represented by a particular number of digital positions and wherein means are provided for synchronizing the reproduction by the reproducing means of the digital bits in the second digital form from the successive digital positions in the storage means to facilitate the restoration of the digital information in the first digital form in the data group.

27. The combination set forth in claim 29 wherein the storage means has magnetic characteristics and wherein the reproducing means are responsive to changes in the polarity of the magnetic flux from the polarity of the magnetic flux previously recorded in the storage means to produce a digital bit of the first characteristics and wherein the digital bits of the first characteristics in the second digital form for the data group are preceded by at least the particular number of digital bits of the second characteristics and wherein the restoring means are responsive to the individual patterns of the bits of the first and second characteristics in the second digital form for the data group to restore the signals of the first and second characteristics in the first digital form for the data group.

28. In combination for reproducing into a first form represented by bits of first and second characteristics digital information recorded on a storage member in a second form to represent information of a data group where the number of bits in the second form is greater by a particular factor than the number of bits in the first form and where each digital bit of the first characteristics in the second form is followed by at least a particular number of bits of the second characteristics in the second form at least equal to the particular factor;

first means for reproducing the digital bits of first and second characteristics in representation of the digital information in the second form for the data group; and second means responsive to the information reproduced by the reproducing means for converting such information into the bits of first and second characteristics of the first form for the data group.

29. The combination set forth in claim 28 wherein the digital bits representing the digital information in the second form in the data groups are preceded by at least the particular number of digital bits having the second characteristics and wherein the second means includes means responsive to such digital bits of the second characteristics for activating the second means to restore, from the reproduced information, the bits of the first and second characteristics of the first form for the data group.

30. The combination set forth in claim 28 wherein a digital bit having the first characteristics is provided as a timing signal in at least one position in the sequence of digital bits representing the digital information in the second form in the data group even when all of such digital information in the data group has digital information of the second characteristics in the first form and wherein means are included in the reproducing means for responding to such timing signal for synchronizing the reproduction in the second form of the digital information in an adjacent data group from the storage means.

31. The combination set forth in claim 29 wherein the number of digital bits in the data group in the second form is twice as great as the number of digital bits in the data group in the first form and wherein at least one digital bit of the first characteristics is provided in the data group in the second form even when all of the digital bits in the first form in the data group have the second characteristics in the data group and wherein means are responsive to the at least one digital bit of the second characteristics in the second form in the data group to synchronize the reproduction by the reproducing means of the digital bits from the successive digital positions in the storage means for the data group and to facilitate the reproduction of the digital information in the first form in the data group.

* * * * *